April 22, 1941.　　R. P. HARSHBERGER　　2,238,899
SAFETY RAZOR
Filed July 7, 1936　　2 Sheets-Sheet 1
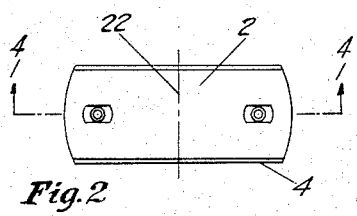
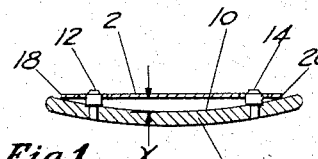 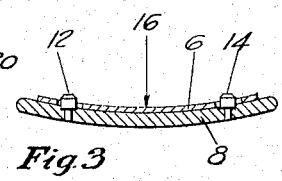 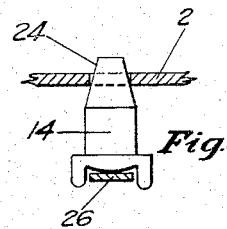
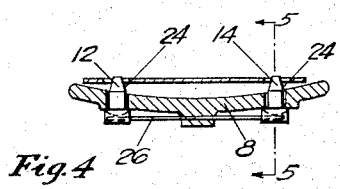 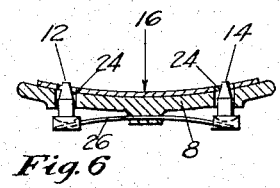
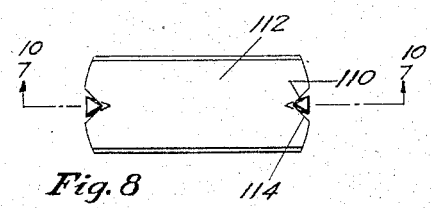 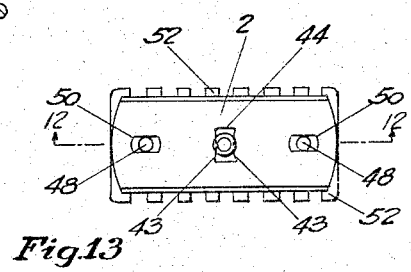
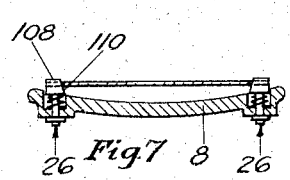 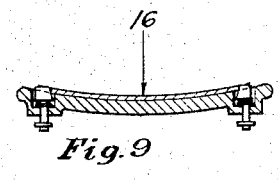 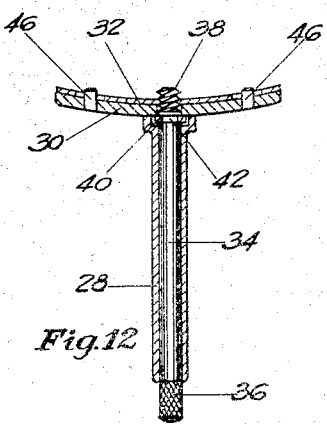
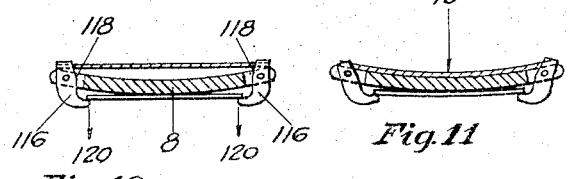
INVENTOR.

April 22, 1941.   R. P. HARSHBERGER   2,238,899
SAFETY RAZOR
Filed July 7, 1936   2 Sheets-Sheet 2

INVENTOR.
Russell Pelton Harshberger

Patented Apr. 22, 1941

2,238,899

UNITED STATES PATENT OFFICE 2,238,899

SAFETY RAZOR

Russell Pelton Harshberger, Pasadena, Calif.

Application July 7, 1936, Serial No. 89,327

11 Claims. (Cl. 30—75)

This invention relates to razors and improvements therein. More particularly it is directed to safety razors including in their application blades of wafer-like structure presenting one or more keen edges.

Prior safety razors usable for shaving generally have been of two types; those securing their blades in flat position and those in which the blades have been slightly flexed along their longitudinal axis to obtain greater stiffness. Razors of the first type have usually been of clumsy and complicated structure and the blades utilized therewith have been comparatively expensive. Also the blades employed have been necessarily heavy and have generally had only one cutting edge, and it has been necessary to clamp blades of this character close to their cutting edges or provide means for holding by end pressure. Razors of the second type have been more generally employed. These customarily utilize pin means for locating the blade with respect to the outer edge of the guard but inaccuracies of fabrication have made it impossible to keep either the pins or associated openings in the blades to a common dimension. When assembled the blades have usually been cocked out of parallelism with the guard edge one way or the other and such has been productive of slicing in shaving. Moreover in the fabrication of blades for this type it has been necessary to carefully shape and remove a considerable portion of the blade in certain areas to sufficiently weaken the material along the line of flexure, and as a result blades of this character have been difficult and delicate to handle, and have been subject to considerable cracking either because of manufacturing strains or misjudgment in assembly.

Razors of both types have presented only straight edges for shaving and have permitted only a single setting of the razor blade. Thus when it is considered that a razor is more generally employed over wavy and oval shaped surfaces, it can be seen that only a portion of the blades in such razors have been regularly utilized with resultant overall inefficiency and the side edges or corners of the blades have often been the cause of nicking. Razors of either type have also usually been awkward in assembly and have not been easily cleared of clogging soap without disassembly.

It is therefore the general object of my invention to overcome the faults and disadvantages of prior safety razors and to present an improved, compact unit that may embody many novel and advantageous features that are effective and generally useful for the purpose described.

More particular objects of the invention are the provision of:

A safety razor presenting a form fitting cutting element.

A safety razor embodying adjustment means to obtain different degrees of closeness of shaving.

A safety razor presenting a concave shaving edge.

A safety razor providing novel means for securing a blade thereto.

A safety razor embodying means for self-centering the blade.

A safety razor providing floating means for normally cradling a blade and for centering said blade with respect to its guard when assembled, without regard to manufacturing variations in the combining parts.

A safety razor in which the razor blade acts as a nut to secure itself to the razor proper and to bring about its own flexure.

A safety razor comprising a wafer-like blade and means for flexing the blade along its transverse axis.

A safety razor providing a guard presenting a longitudinal concavular upper face, a resilient shaving member and means for securing said member thereto.

A safety razor in which substantially the full cutting edge may be utilized in operation.

A safety razor that may be easily assembled, readily cleaned without disassembly and that is simple in operating adjustment, and, Means for centering a blade in a holder for sharpening to obtain parallel cutting edges, comprising floating tapered pins compensating for variations in blank hole sizes by moving to a contracting and/or filling position, and means for clamping the blank in the holder.

These and other objects and features of the invention relating to the improved holder, the improved safety razor, the novel association of parts, and the improved assembly and application thereof, and all its parts and combinations, will in part be obvious and in part be pointed out in the subsequent detailed description and in the claims, taken in conjunction with the accompanying drawings, wherein:

Fig. 1 is a section thru 1—1 of Fig. 2 illustrating the invention in one position of assembly.

Fig. 2 is a plan view of the razor blade of Fig. 1 indicating its centering means.

Fig. 3 is Fig. 1 showing the razor blade in another position.

Fig. 4 a section thru 4—4 of Fig. 1 is illustrating another feature of my invention, in one position of assembly.

Fig. 5 is an enlarged section thru 5—5 of Fig. 4 showing a feature of the invention.

Fig. 6 is Fig. 4 in elevation showing the parts in a changed position.

Figs. 7 to 11 inclusive show modifications of the principle illustrated in Fig. 4.

Fig. 12 is a longitudinal cross sectional elevation of one embodiment of my razor.

Fig. 13 is a plan view of the head end of the razor of Fig. 12.

Figure 15:
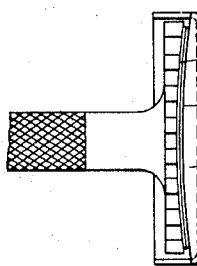
Figure 14:
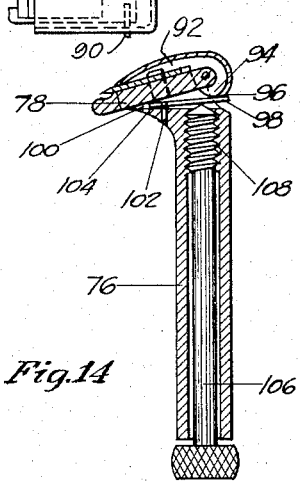

Fig. 14 is a sectional elevational view of a modified form thru 14—14 of Fig. 15, the razor head being inclined.

Fig. 15 is a plan view of the head of the razor of Fig. 14 taken normal to the line of inclination.

Figure 16:
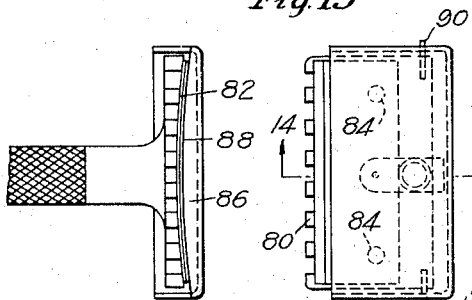

Fig. 16 is a side elevation of the head end of the razor of Fig. 14 taken at the cutting edge side.

Figure 17:
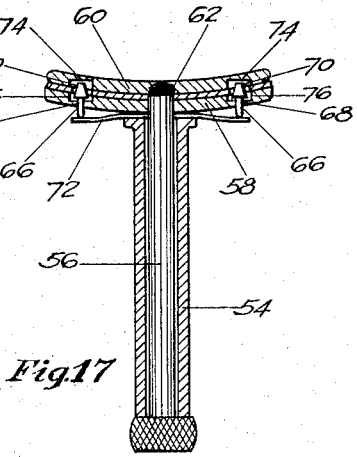

Fig. 17 is a cross-sectional elevation of another form of the razor of my invention.

Figure 18:
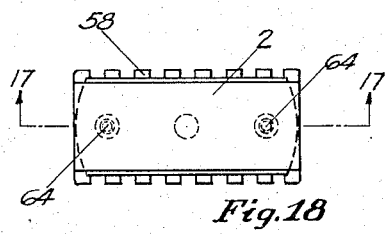

Fig. 18 is a plan view of the head end of the razor of Fig. 17.

Figure 19:
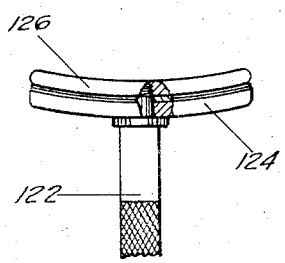
Figure 20:
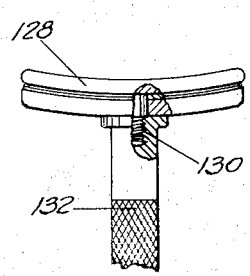

Figs. 19 and 20 are modifications of the head end of the razor of my invention.

In general the objects of my invention may be carried out by providing an arrangement whereby a razor blade 2 having at least a single cutting edge 4 is properly mounted as to present with other essential parts a cutting means 6 of concave outline. Such arrangement may preferably comprise a guard 8 having a concave face 10, a normally flat blade 2 of flexible character guide means 12 and 14 which may be pins for locating and guiding the blade in place on the guard and pressure means 16 which may be for instance a screw or a cap for securing the blade to the guard so that it assumes the general formation of its face. In assembly the substantially flat blade will be placed upon the shaped face 10 of the guard, its ends 18 and 20 resting thereon and spanning the underlying shaped portion. Thereafter it may be secured to the guard by means 16 transmitting pressure to a local central zone of the blade so as to cause flexing to occur substantially on the transverse axis 22 of the blade and causing its longitudinal axis to assume a curved shape. This pressure will be transmitted to the points of support at the ends of the blade and the greater the amount of flexure the greater the amount of pressure will be exerted, the limit of curvature being reached when the blade has assumed an outline homologous with the face of the guard. I have found that a drop at the center of a blade of the well-known wafer type between 1/64" and 1/8" is preferred for ordinary shaving and also I have found bending in amounts as great as 1/4" are useful and desirable in certain instances. However, I do not desire to be limited to these preferred amounts as other amounts of flexure coming within the scope of my invention, which I believe to be broadly new, may be found to be desirable.

In shaving operations the curvature thus obtained will be useful in shaving. By varying the amount of flexure or distance $x$ various degrees of closeness of shaving may be obtained but in all instances the end edges of the blade, due to the pressure contact set-up, will be in contact with the face of the guard and when the razor is used no nicking will be caused by the corners of the blade. Also the flexing of the blade will serve to stiffen the cutting edge and such flexing will occur on the section most adapted therefor and without necessitating weakening of the blade or causing resultant splitting. Furthermore by utilizing the concave face principle the razor may be cleared of clogging soap during use without disassembly for by partially releasing the pressure means 16 the blade will separate sufficiently from the guard to permit proper cleaning.

In addition I propose to provide novel means for simplifying assembly and to properly center the razor blade with respect to the guard edge. The principle of such means is illustrated for instance in Figs. 4 and 6. Here the elements 12 and 14 instead of merely functioning as dowels for the blade 2 as in the arrangement in Figs. 1 and 3, have their receiving ends of a shape, for instance a tapered shape 24 to contact and center the openings in the blade 2. Further they may be rotatable and moveable up and down on their journal, and are preferably held outwardly from the guard face by a means 26 which may be a spring. In carrying out the assembly employing such structure the blade is placed over the portions 24 of the elements 12 and 14 which are held a sufficient distance from the guard face by the means 26 to make the assembly easily accomplished, and pressure is applied through the means 16 to the blade. The elements 12 and 14 will move in response to the pressure applied to the blade 2 and such motion will cease with the motion of the blade. In operation the elements 12 and 14 will at all times center the blade member 2 and will exert a pressure against a side thereof. Also their portions 24 will preferably have a tough and hard surface that will contribute to long wear and the rotatability of such members will assure changing the point of contact with the blades to enhance such service. By a slight release of pressure the blade will be held away from the guard and cleaning away of soap may be easily accomplished. The advantage of the novel principle thus described will be apparent and it can readily be seen that its application is equally applicable to flat or curved razor blades or blades to be flexed in assembly as herein described in one form of my invention or may even be extended to the fabrication of the razor blades themselves where in the sharpening operations the blade is secured to a suitable mount. By applying the above principle of mounting, the blades will be sharpened in true parallelism with their centering apertures and there will be no question of their proper location in the razor holder. Further, due to the outward action of the guide elements the blades may be more readily removed.

Referring now more particularly to the drawings for various embodiments of the invention, Fig. 12 illustrates the invention in a simple form comprising a tubular handle 28 on one end of which may be mounted a head and guard 30 of suitable shape. The head may be rigidly secured to the handle by means not shown and its upper guard face 32 is preferably concave, but may also under certain conditions be of spherical or other shapes providing a longitudinal section is concavular. Centered and rotatably mounted in the handle 28 is a stem 34 having its lower end projecting beyond the extremity of the handle and preferably having a portion thereof as at 36 provided with a suitable friction grip to insure easy rotation. The other end of the stem is provided with means to catch and grip the blade. Such may be a threaded portion 38 preferably a thread of multiple character and having its end slightly tapered at the top to facilitate blade assembly.

Positioned on the stem just below the threaded portion is a means for locating the stem with respect to the guard. This may be a thrust collar 40 which may comprise, for instance, a snap ring or a flat washer, split or divided into two sections. Such means are preferably seated and held in an annular recess in the handle at its juncture with the guard and loosely projecting into an annular groove 42 on the stem thereby locating it in a fixed position. A razor blade 2 comprising a substantially thin and flat metallic membrane of considerable flexibility and hardness and having a recess 44 is secured to the head 30 by the stem 34. This may be accomplished by having the wall of the blade surrounding its aperture 44 engage the threaded end 38 of the stem 34. Such threaded portion while preferably of a multiple character is also preferably of double or other even multiple pitch so that it may simultaneously catch both inward projections 43 of the blade recess 44 and moreover, its element is preferably of buttress outline in order to assure smooth operation and good contact. By rotating the stem the blade will be quickly drawn toward the face 32 of the head 30 where it is guided into position, for instance, by means of pins 46 the projections 48 of which pass into the annular, or elongated, recesses or slots 50 of the blade. The pins 46 preferably have their portions 48 projecting above the head tapered at the tips, such more readily entering the slots 50 and also serving to properly center the blade on the guard in proper relation to the guard teeth 52 which are of customary construction.

In the assembly thus described it can be seen that the blade 2 acts also as a nut which when centered and caught by the threaded stem 34 is pulled down against the shaped seat 32 of the head. Further by a slight rotation of the stem the position of the blade with respect to the face of the guard may be quickly altered to obtain different degrees of closeness of shaving, and in this construction the handle 28 is independent of the locking and adjusting means so that in use such settings are not apt to be disturbed.

In Fig. 17 I have shown a modification of the means to obtain a desirable assembly which includes features of the structure of Fig. 12 and utilizes a separate cap for clamping the blade. The structure preferably comprises a handle 54 having loosely centered therein a stem 56 which also passes through suitable apertures in the blade 2 and a guard 58 and journals in a cap 60 by means of the thread 62. The guard as before has a concave face and the cap has its under face substantially complementary thereto in order to effect a smooth clamping of the blade. Also the upper face of the cap preferably is convex on its transverse axis so that a smooth top converging toward the edge of the blade is obtained. As with the structure of Fig. 12, here again when the blade is set in position there is little chance of any change in setting during operation. A novel feature of the assembly resides in the guide means for the blade, the principle of operation of which I have already described with respect to Figs. 4 and 6. Such preferably comprises the pins 64 having a shank portion 66 rotatably and movably journaled in the bearings 68 of the head or guard 58 and having a tapered head portion 70 for passing into the blade apertures. The tip of this portion is somewhat smaller than the blade apertures to facilitate easy entrance therein and is tapered divergingly to form a portion of greater dimension than the blade aperture so as to provide a seat therefor somewhere between. The pins are preferably cushioned and upwardly directed by means which may be the resilient spring member 72 secured by suitable means to the under face of the guard 58. In order to provide for clear movement of the pins the cap 60 is provided with recesses 74 for clearing the tips thereof and where the base end is shouldered the guard is also recessed as at 76 to provide for their downward movement. Also in order to limit the outward movement of the pins, means not shown but which may be the element 72 are provided. Prior to assembly the pins normally project above the uppermost plane of the concave face of the head 58. Thus the razor blade may be easily set upon the pins which automatically center it with respect to the guard teeth and contact the edges of the apertures therein even though they vary in size with respect to each other or between respective blades. Further when the cap 60 is brought into position and drawn toward the guard the pins continually guide the blade while flexure occurs and recede in the guard as such action continues until the blade is finally positioned. Also as with the structure of Fig. 12 the blade may be adjusted for different degrees of closeness of shaving and for cleansing.

In certain instances I have found that a razor having an oblique head has desirable advantages when in use. My invention is also adapted to such construction and, a suitable structure by which such end may be obtained is illustrated in Figs. 14–16 where 76 is a tubular handle having integral therewith or suitably connected thereto a head 78 which is preferably offset with respect to the vertical axis of the handle and inclined at an acute angle with the horizontal. The head is provided with guard teeth 80 along an edge thereof of the usual construction and a groove adjacent thereto to receive accumulations of soap or the like during the shaving process to prevent clogging, and its blade contacting face 82 as in the previous structure described is so shaped that a longitudinal section presents a concave surface outline. With further reference to the guard teeth I wish it understood that while I have depicted in Fig. 16 the teeth as having their faces parallel to the vertical axis of the handle, I may also make them radial to substantially the common center of the concave surface. Such construction is equally applicable to all other modifications illustrated. The head is also provided with guide means for the blade which may be the pins 84 of any of the described shapes, secured to the head 78 by any of the described or other suitable means. Such guide means are positioned as to project above the face of the head so as to guide the blade into position in proper relation to the guard and maintain such relation while the blade is being clamped to the head.

In order to maintain the blade in position and in proper relation to the curved face of the head and to facilitate convenient removal and replacement thereof, I provide a cap 86 which partly covers the blade and which preferably has its under face as at 88 of substantially similar shape as the adjacent face 82 of the head. Thus a substantial portion of such face may be in contact with the top face of the blade and will provide a proper fulcrum for it when it is flexed in assembly, it being understood that in such instances the blade is preferably of a wafer-type or other resilient construction. A novel feature of the razor resides in the pivoting of the cap in any sutiable manner for movement relative to the razor guard as by means of the pins 90 at either end freely journaled in projecting side ears of the cap and preferably rigidly journaled in the head. Internally the cap is recessed as at 93 to clear the pins 84 and also has a portion 94 projecting beyond and below the pivots. The latter portion has a face 96 which contacts with suitable means which may comprise a substantially rigid or resilient member 98, preferably of metal, set in a substantially fitting recess 100 between the head 78 and handle body 76, and located therein as by the pin 102. One end of the member 98 rests upon a ledge 104 while its other end contacts the cap on its top side as at 96. Between these two points of contact the element 98 is supported by a stem 106 which may be adjusted up or down as by the screw portion 108 operating in a similarly threaded portion in the handle 76. By advancing the stem in a direction as to raise the element 98 a pressure is transmitted through the leverage created by such element to the point of contact 96 with the cap. This in turn is transmitted due to the pivots 90 to the under face of the cap in contact with the blade. Such movement may be continued until the blade has assumed its proper position with respect to the head. In this manner the blade is securely held in the frame and adjusted to any position of flexure. Further all the necessary force is readily available to flex the blade. By proper selection of the member 98 an initial setting may be maintained so that part or the whole of such member may be utilized to maintain the cap in an open position when manipulating the blade.

In the structure described it is preferred that the stem 106 be provided for instance at its lower end with a suitable friction grip and that its end in contact with the element 98 be preferably conical in shape. Further a considerable portion of the interior of the handle 76 may be cleared so that the stem 106 may be quickly inserted or removed from position. The handle also may be provided with annular grooves or diamond knurl to provide a suitable grip.

Further novel modifications I provide reside in additional arrangements of the guide and centering means previously described with respect to Figs. 4, 6 and 17. These I have shown substantially in principle in Figs. 7 to 11 inclusive and are particularly adapted for accurate positioning of the razor blades with respect to their guards. Such features enable me to avoid the interior type of guide recesses heretofore provided in razor blades, that have required accurate sizing to fit their receiving guide members, and permit in their stead easily formed notches in the end portions of the blade. In Fig. 7 I have shown a head 8 provided with a pair of floating, upwardly projecting guide means 108 which may be pins similar to those described with respect to Figs. 4, 5, 6 and 17 except that in this instance they are non-rotatable and are formed on their inner faces with knife edges 110 which are inclined to their axis of movement and converge toward each other so as to provide edges of considerable length to allow generous variations in the razor blades. Such knife edges receive the blades substantially as illustrated in Fig. 8 where a razor blade 112 is shown provided with end, preferably V-shaped notches 114 the bottoms of which preferably contact the knife edges 110. In assembly as the element 16 is applied to the blade, the guide means 108 will recede in their journals as pressures applied and/or flexing of the blade occurs and the notches 114 will automatically adjust themselves along the knife edges in step with the flexing action until the blade is in final position.

A substantially smoother action may be obtained by utilizing as the knife edge carrier a pair of rocker arms 116 which are shown in Fig. 10 pivoted by suitable means in the end portions of the head 8, the knife edges being on the edge 118 and being normally held in an inclined position for instance by a spring applying a downward pressure at the position 120. In this arrangement when the flexing force of the element 16 is applied the arms 116 merely rock about their axis and the knife edges shift their position in the notches 114.

In Figs. 19 and 20 I have illustrated further features that may be used in the razor holders. Fig. 19 showing an arrangement wherein a stem 122 also acts as the handle and is slidably fitted in a head 124 and connects with a cap 126 as by corresponding threaded parts. It should be noted that the cap is also shaped on its contacting face substantially complementary to the curved face of the head. In assembly the blade is guided by means not shown and is seated and held between the head and cap by the action of the threaded stem in drawing the parts together.

In order to facilitate the assembly of the cap I have shown in Fig. 20 a structure where a cap 128 is provided with a threaded stem 130 which projects through the blade and head in assembly and seated in the internal thread of the handle 132.

From a consideration of the foregoing descriptions it will be seen that I have provided a new and novel razor embodying new features that are a distinct improvement over those of the prior art and one that may be economically produced, that is simple in structure, that may be quickly assembled and that may be easily cleaned.

Further I desire it to be understood that while I have principally described the use of a fixed and resilient blade, the invention is also susceptible to oscillatory razors and to the use of rigid formed blades. Also while I have described herein in detail a number of preferred forms of carrying out my invention and have described various features in conjunction with certain structures, I do not thereby intend to limit myself to the specific forms and arrangements shown, as the features may be combined in various other ways and alternative constructions will present themselves to those skilled in the art. I therefore desire to secure to myself all modifications and alternative constructions falling within the spirit and scope of the invention as expressed in the foregoing specification and I desire that the invention be construed to cover equivalents and as broadly as the claims taken in conjunction with the prior art, may allow.

I claim:

1. In a safety razor, the combination comprising a razor head having a blade mounting face and a pair of movable blade receiving members guided in and projecting outwardly of said blade mounting face, said members being spaced apart longitudinally of the head and having motion toward and away from said blade mounting face, and said members adapted to engage the marginal edges of a recessed portion of a blade and have shaped surface portions of said members cradle said blade away from the blade mounting face, and said blade receiving members adapted to carry and guide the blade to the blade mounting face when clamping said blade with respect to the head.

2. In a razor holder, the combination comprising a blade bed having a blade mounting face, a blade, movable blade centering means operable in said bed and projecting outwardly of said blade mounting face, said centering means having sloping sides upon which to cradle said blade away from said face and means to move said blade and centering means toward said blade mounting face.

3. In a safety razor, a razor head having a blade mounting face, a pair of blade receiving members carried in said head, said members being movable with respect to said head and being projected outwardly of said mounting face by resilient means and said members having wedge shaped portions along which they are adapted to cradle a blade away from said blade mounting face, and said members adapted to carry and guide said blade to the head upon being depressed when clamping the blade.

4. In a safety razor, a razor head having a blade mounting face, a recessed blade, and a pair of longitudinally spaced movable blade receiving members carried in said head and projecting outwardly of said blade mounting face, said members having motion to and away from said mounting face and having tapered portions engaged with the marginal wall of the blade recess, said tapered portions adapted to cradle the blade away from the mounting face prior to clamping of the blade, and said movable members adapted to carry and guide the blade to the head upon being depressed when clamping the blade.

5. In a safety razor, a razor head having a blade mounting face, a pair of pin members carried in said head and adjustable in a direction away from and toward said blade mounting face, each of said pin members having a tapered portion along which to engage the marginal wall of a blade recess, and a recessed blade engaged with the said tapered pin portions and clamped with respect to said blade mounting face.

6. In a razor, a blade supporting bed and guard for holding a recessed blade, a recessed blade, a plurality of movable members for initially seating the blade in assembly, and supporting the blade away from said bed, said members having inclined surfaces for engaging the blade recess and centering said blade with respect to said guard, and becoming depressed in the bed upon conveying the blade thereto when clamping said blade.

7. In a razor, a blade supporting bed and guard, a recessed blade, a pair of spaced blade seating members operable in said blade supporting bed and engaged with said blade, and adapted to cradle said blade away from said bed, resilient means bearing against said blade seating members and urging said blade away from the supporting bed, and means to clamp the blade in shaving position.

8. In a razor, a blade supporting bed and guard, a recessed blade, a pair of rocker arms journaled in said supporting bed at opposite ends thereof, said arms having blade seating faces engaged with the blade recess walls, and adapted to cradle said blade away from said supporting bed, resilient means transmitting pressure against said arms in a manner to urge the blade away from the blade receiving face of said supporting bed, and means to clamp the blade in shaving position.

9. In a safety razor, as claimed in claim 3, wherein the wedge shaped portions of the movable blade receiving members comprise substantially knife edges.

10. In a safety razor, a blade supporting bed having an arcuate blade receiving face, a flexible blade, movable blade centering means operable in said bed and urged outwardly of said blade receiving face by spring means, said movable centering means having sloping sides upon which to normally cradle said blade away from said blade receiving face, a tubular handle, blade clamping means, and means to adjust said blade and centering means toward said blade receiving face.

11. In a safety razor, the combination comprising a blade supporting bed having a blade mounting face, a blade having a pair of spaced apart V-shaped recesses longitudinally thereof and oppositely directed, movable blade receiving members operable in said bed and projecting outwardly of said blade mounting face, said members having wedge shaped portions upon which to normally cradle a blade away from said blade mounting face and said wedge shaped portions being engaged with said V-shaped recesses of said blade and means to move said blade and receiving means toward said blade mounting face.

RUSSELL PELTON HARSHBERGER.